(12) United States Patent
Day et al.

(10) Patent No.: US 9,731,472 B2
(45) Date of Patent: *Aug. 15, 2017

(54) COMPOSITE CORES AND PANELS

(71) Applicant: MILLIKEN & COMPANY, Spartanburg, SC (US)

(72) Inventors: Stephen W. Day, Dayton, OH (US); Michael S. Sheppard, Kettering, OH (US); Frederick Stoll, Spartanburg, SC (US); Danny E. Tilton, Burnside, KY (US)

(73) Assignee: Milliken & Company, Spartanburg, SC (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/716,420

(22) Filed: May 19, 2015

(65) Prior Publication Data
US 2015/0258746 A1    Sep. 17, 2015

Related U.S. Application Data

(60) Division of application No. 13/898,927, filed on May 21, 2013, now Pat. No. 9,186,863, which is a
(Continued)

(51) Int. Cl.
*B32B 3/26* (2006.01)
*B29C 70/08* (2006.01)
(Continued)

(52) U.S. Cl.
CPC .............. *B32B 3/26* (2013.01); *B29C 70/086* (2013.01); *B32B 3/16* (2013.01); *B32B 3/18* (2013.01);
(Continued)

(58) Field of Classification Search
CPC ............ B32B 3/26; B32B 3/16; B29C 70/086
(Continued)

(56) References Cited

U.S. PATENT DOCUMENTS 2,053,173 A    9/1936  Astima ............................. 88/24
2,062,590 A    12/1936 Lundquist ........................ 41/23
(Continued)

FOREIGN PATENT DOCUMENTS

CA    446910    2/1948
CA    658023    2/1963
(Continued)

OTHER PUBLICATIONS

U.S. Appl. No. 12/924,611, filed Sep. 30, 2010.
(Continued)

*Primary Examiner* — Brent O'Hern
(74) *Attorney, Agent, or Firm* — Cheryl J. Brickey

(57) ABSTRACT

The plurality of pieces of low density cellular material, such as foam plastics, form a core panel having opposite side surfaces and with adjacent pieces having opposing edge surfaces extending between the side surfaces. Sheets of flexible material, such as veils or mats or scrim, are adhesively attached to the side surfaces, and portions of one sheet extend between the opposing adjacent edge surfaces for limiting flexing of the panel. The pieces may be tapered, and portions of the one sheet may project between the edge surfaces either partially or fully to form double wall webs. The webs may have flanges adhesively attached to the other sheet on the opposite side. One sheet may also be stretchable in areas not adhesively attached to the pieces to provide for curving the panel from a planar position maintained by the sheet on the opposite side.

7 Claims, 5 Drawing Sheets

Related U.S. Application Data continuation of application No. 12/924,611, filed on Sep. 30, 2010, now Pat. No. 8,470,425.

(60) Provisional application No. 61/277,934, filed on Oct. 1, 2009.

(51) Int. Cl.

| | | |
|---|---|---|
| *B32B 3/16* | (2006.01) | |
| *B32B 5/18* | (2006.01) | |
| *B32B 5/22* | (2006.01) | |
| *B32B 5/24* | (2006.01) | |
| *B32B 5/32* | (2006.01) | |
| *B32B 27/00* | (2006.01) | |
| *B32B 38/18* | (2006.01) | |
| *B32B 37/18* | (2006.01) | |
| *E04C 2/38* | (2006.01) | |
| *B32B 7/12* | (2006.01) | |
| *B32B 5/02* | (2006.01) | |
| *B32B 5/26* | (2006.01) | |
| *B32B 7/04* | (2006.01) | |
| *B32B 21/08* | (2006.01) | |
| *B32B 21/10* | (2006.01) | |
| *B32B 27/06* | (2006.01) | |
| *B32B 27/12* | (2006.01) | |
| *B32B 3/18* | (2006.01) | |
| *B32B 3/28* | (2006.01) | |

(52) U.S. Cl.
CPC ............... *B32B 3/28* (2013.01); *B32B 5/022* (2013.01); *B32B 5/028* (2013.01); *B32B 5/18* (2013.01); *B32B 5/22* (2013.01); *B32B 5/24* (2013.01); *B32B 5/245* (2013.01); *B32B 5/26* (2013.01); *B32B 5/32* (2013.01); *B32B 7/045* (2013.01); *B32B 7/12* (2013.01); *B32B 21/08* (2013.01); *B32B 21/10* (2013.01); *B32B 27/00* (2013.01); *B32B 27/065* (2013.01); *B32B 27/12* (2013.01); *B32B 37/18* (2013.01); *B32B 38/1866* (2013.01); *E04C 2/38* (2013.01); *B32B 2262/0276* (2013.01); *B32B 2262/101* (2013.01); *B32B 2305/02* (2013.01); *B32B 2305/022* (2013.01); *B32B 2307/54* (2013.01); *B32B 2307/546* (2013.01); *B32B 2307/72* (2013.01); *B32B 2317/16* (2013.01); *B32B 2603/00* (2013.01); *B32B 2607/00* (2013.01); *Y02E 10/721* (2013.01); *Y10T 156/10* (2015.01); *Y10T 156/1093* (2015.01); *Y10T 428/17* (2015.01); *Y10T 428/233* (2015.01); *Y10T 428/24* (2015.01); *Y10T 428/24132* (2015.01); *Y10T 428/24496* (2015.01); *Y10T 428/24752* (2015.01); *Y10T 428/249953* (2015.04); *Y10T 428/249982* (2015.04)

(58) Field of Classification Search
USPC .......................................................... 428/53
See application file for complete search history.

(56) References Cited

U.S. PATENT DOCUMENTS

| | | | | |
|---|---|---|---|---|
| 2,493,032 | A | 1/1950 | Rheinfrank, Jr. | 154/125 |
| 3,192,099 | A | 6/1965 | Beckman et al. | 161/43 |
| 3,230,995 | A | 1/1966 | Shannon | 156/166 |
| 3,243,492 | A | 3/1966 | Voelker | 264/346 |
| 3,246,058 | A | 4/1966 | Voelker | 264/47 |
| 3,264,153 | A | 8/1966 | Rodman et al. | 156/79 |
| 3,298,892 | A | 1/1967 | Lippay | 161/38 |
| 3,339,326 | A | 9/1967 | Derr et al. | 52/309 |
| 3,472,728 | A | 10/1969 | Hitch | 161/69 |
| 3,526,556 | A | 9/1970 | Berner | 156/79 |
| 3,544,417 | A | 12/1970 | Corzine | 161/50 |
| 3,549,449 | A | 12/1970 | Windecker | 156/254 |
| 3,567,541 | A | 3/1971 | Kaczerginski | 156/172 |
| 3,697,633 | A | 10/1972 | Edgar | 264/45 |
| 3,708,385 | A | 1/1973 | Immethun | 161/69 |
| 3,733,235 | A | 5/1973 | Light et al. | 156/260 |
| 3,734,811 | A | 5/1973 | Small et al. | 161/37 |
| 3,750,355 | A | 8/1973 | Blum | 52/309 |
| 3,841,958 | A | 10/1974 | Delorme | 161/161 |
| 3,867,238 | A | 2/1975 | Johannsen | 161/37 |
| 3,906,137 | A | 9/1975 | Bauer | 428/315 |
| 4,042,746 | A | 8/1977 | Hofer | 428/311 |
| 4,048,365 | A | 9/1977 | Hoover | 428/215 |
| 4,093,762 | A | 6/1978 | Kiefer | 428/55 |
| 4,119,750 | A | 10/1978 | Porter | 428/105 |
| 4,179,540 | A | 12/1979 | Smarook | 428/71 |
| 4,196,251 | A | 4/1980 | Windecker | 428/311 |
| 4,223,053 | A | 9/1980 | Brogan | 428/35 |
| 4,262,052 | A | 4/1981 | Kannan et al. | 428/306 |
| 4,275,473 | A | 6/1981 | Poirier | 9/13 |
| 4,292,369 | A | 9/1981 | Ohashi et al. | 428/313 |
| 4,330,494 | A | 5/1982 | Iwata et al. | 264/46.2 |
| 4,361,613 | A | 11/1982 | Bogner et al. | 428/119 |
| 4,380,253 | A | 4/1983 | Mead et al. | 138/149 |
| 4,411,939 | A | 10/1983 | Hawkins et al. | 428/58 |
| 4,412,880 | A | 11/1983 | Wintermantel | 156/156 |
| 4,498,941 | A | 2/1985 | Goldsworthy | 156/148 |
| 4,521,266 | A | 6/1985 | Careddu | 156/242 |
| 4,536,427 | A | 8/1985 | Kohn | 428/44 |
| 4,546,024 | A | 10/1985 | Brown | |
| 4,608,103 | A | 8/1986 | Aldrich | 156/64 |
| 4,617,217 | A | 10/1986 | Michaud-Soret | 428/71 |
| 4,670,338 | A | 6/1987 | Clemino | 428/312.6 |
| 4,687,691 | A | 8/1987 | Kay | 428/73 |
| 4,807,969 | A | 2/1989 | Shimodaira et al. | 350/320 |
| 4,808,461 | A | 2/1989 | Boyce et al. | 428/119 |
| 8,470,425 | B2 * | 6/2013 | Day | B29C 70/086 416/223 R |
| 2009/0202776 | A1 * | 8/2009 | Brandon | B32B 3/18 428/56 |

FOREIGN PATENT DOCUMENTS

| | | |
|---|---|---|
| CA | 2 725 735 | 12/2009 |
| DE | 1951310 | 4/1970 |
| DE | 1949209 | 4/1971 |
| DE | 2236479 | 2/1974 |
| DE | 19715529 | 8/1998 |
| EP | 0 293 612 | 7/1988 |
| EP | 0 569 846 | 11/1993 |
| FR | 1 596 868 | 6/1970 |
| GB | 245458 | 5/1926 |
| GB | 548027 | 9/1942 |
| GB | 0 559 527 | 2/1944 |
| GB | 1 265 835 | 3/1972 |
| GB | 1 375 877 | 11/1974 |
| GB | 2 253 588 | 9/1992 |
| GB | 0 672 805 | 9/1995 |

OTHER PUBLICATIONS

Patent Cooperation Treaty PCT International Search Report. Date of Mailing, Dec. 1, 2010. International Application No. PCT/US10/02656. International Filing Date: Sep. 30, 2010.

* cited by examiner

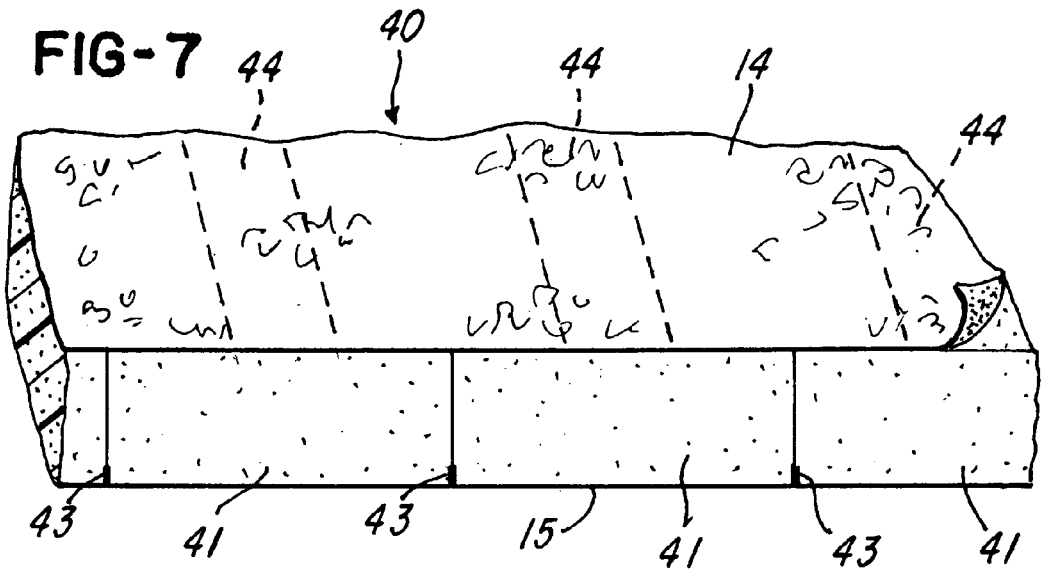
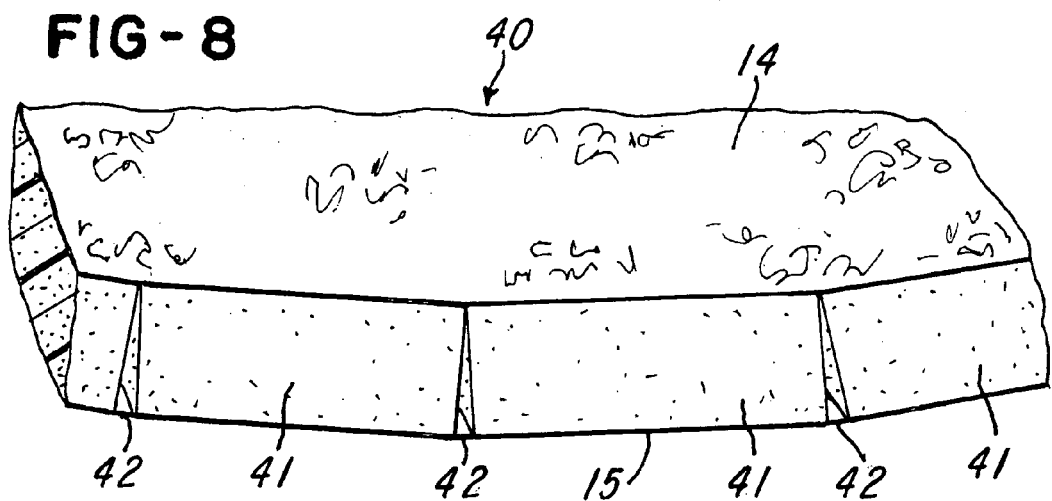
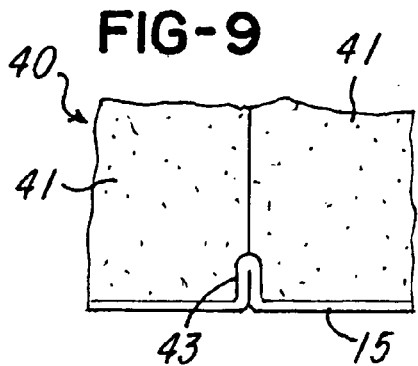
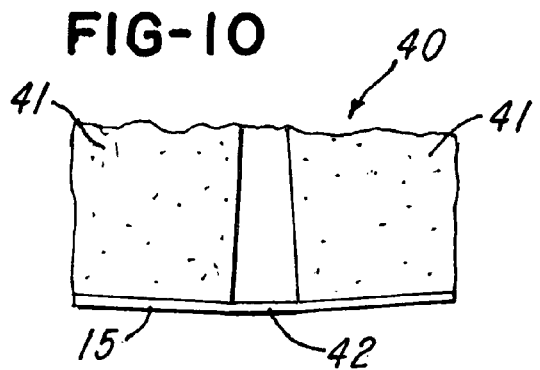

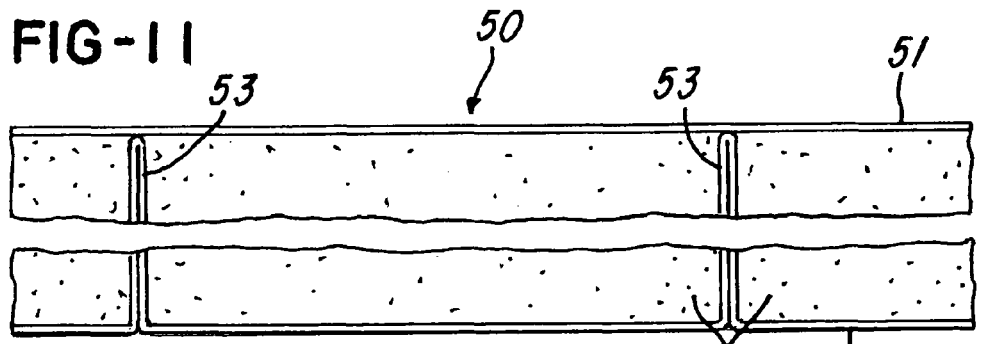
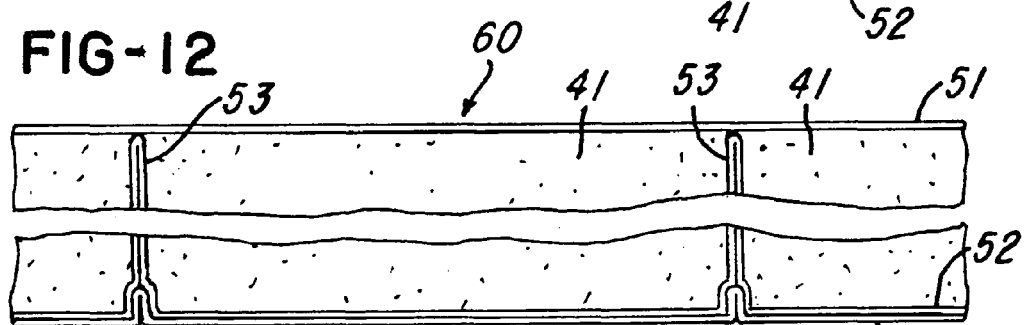
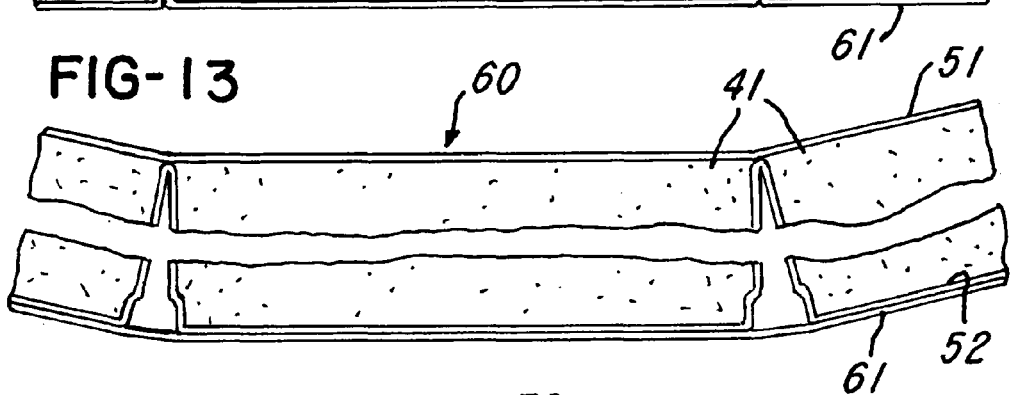
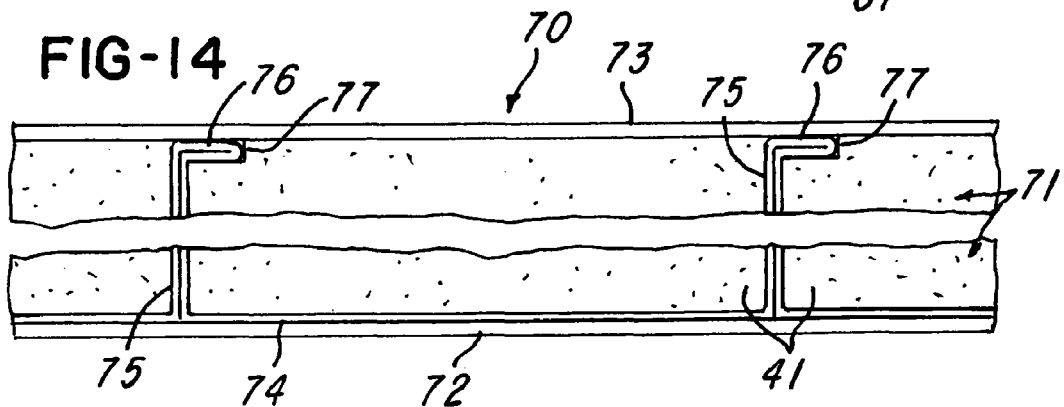

COMPOSITE CORES AND PANELS

FIELD OF THE INVENTION

This invention relates to composite sandwich panels comprising rigid skin materials separated by and bonded to generally lower density core materials. More specifically, the invention relates to sandwich panels having cores which may be conformed to simple or compound curvature while being placed between flexible skins in a curved mold prior to the skin and core components being adhered together by a hardenable adhesive resin to form a rigid structure.

BACKGROUND OF THE INVENTION

In many applications, composite sandwich panels are partially or entirely curved, rather than having only planar surfaces. A prominent example is the blades of wind turbines used to produce electrical energy. These blades are commonly comprised of sandwich panels, and the cores of those panels are required to conform to specified curvatures within the blades. The principal core materials used today in the production of wind turbine blades are balsa wood and foam plastics. In prior art, conformability of these materials is often achieved by cutting or scoring through the thickness of the wood or foam core to divide it into a plurality of strips or blocks of rectangular cross-section. These are adhesively connected, on only one face of the core, to a continuous flexible sheet material, commonly a scrim comprising fiberglass rovings.

The flexible scrim serves as articulated joints between each of the rigid strips or blocks. When the core panel embodying prior art is placed into a concave mold, with the non-scrim face of the panel against the mold surface, the strips or blocks hinge open relative to one other, forming wedge-shaped spaces within the core panel between opposing surfaces of the strips or blocks. These spaces fill with resin during the molding process, thus increasing the weight and cost of the sandwich panel. The resin within the spaces is not combined with reinforcing material, such as fiberglass, so its structural contribution to the panel is severely limited.

In some core panels, the low density cellular material is scored mostly, but not entirely, through the thickness of the core, and the flexible sheet material is omitted. The cutting or scoring of the balsa wood or foam plastic is generally done using saw blades, and the score lines comprise saw kerf voids which fill with undesired molding resin even when the core panel is in a planar position in a non-curved mold. The saw kerfs between the strips or blocks permit a limited degree of articulation when the core panel is placed in a concave mold with the scrim against the mold surface, but the core panel retains wedge-shaped voids between the strips or blocks which fill with excess resin.

SUMMARY OF THE INVENTION

A core panel constructed in accordance with the present invention preferably includes a plurality of strips or blocks of low density cellular material, generally of rectangular or trapezoidal cross section. Those faces of the strips or blocks which comprise each of the opposing faces of the core panel are adhesively connected to sheets of flexible material, for example, a veil, mat or scrim which includes fiberglass rovings having sufficient tensile strength to maintain alignment of the strips or blocks during handling and machining.

In the production of composite panels, it is often necessary to machine the core panels to specified dimensions, for example by cutting with band saws, reciprocating saws or routers. Machining is substantially facilitated if the core panel is rigid enough to prevent it from folding or otherwise distorting during the machining and associated handling processes. Balsa wood and foam plastics blocks adhesively attached to a scrim material overlying only one face of the core panel have limited handling stability, since the rows of strips or blocks are able to fold back upon adjacent rows by a full 180 degrees under gravitational or other forces. Additionally, individual balsa or foam blocks are subject to being pulled loose or peeled away from the single-side scrim by the machining forces.

The core panels of the present invention provide greatly increased ease of handling and resistance to damage during machining. This feature results from the fact that all of the strips or blocks comprising the core panel are adhesively attached to continuous facer mat or scrim overlying both faces of the core panel. Individual strips or blocks are unable to fold back upon adjacent strips or blocks, since their movement is limited by the veils to which they are adhered. Since the strips or blocks are bonded to and stabilized between two veils, they are substantially more resistant to being peeled or pulled away from the veils during machining.

On one face of a core panel constructed in accordance with the present invention, edges of opposing strips or blocks are adjacent each other, and the attached first veil maintains this edge alignment during handling and machining. The dimensions of this veil substantially match the dimensions of the core panel, which are substantially equal to the sum of the dimensions of the faces of the strips or blocks adjacent the veil.

A second veil, adjacent the opposite face of the core panel, is of greater width than the sum of the dimensions of the faces of the strips or blocks which are adhered to it, and portions of this veil extend between the edges of opposing strips or blocks. This second veil limits the distance by which the edges of opposing strips or blocks may be separated, thus enhancing the stability of the core panel during handling. The veil is sufficiently flexible to fold, or buckle, allowing the edges of the strips or blocks to which it is attached to be brought closer together while conforming the core panel to a mold surface, and the folded portions of the veil extend between opposing faces of the strips or blocks. The folded portions of the veil may be lightly bonded to each other, using adhesives which maintain the flatness of the core panel during machining and handling, but which allow articulation of the strips or blocks as the core panel is conformed to the mold.

If desired, the folded portions of the second veil, or mat, may be of sufficient depth to extend through the thickness of the core panel to the inner face of the first veil. When the mat is comprised of porous structural material, such as fiberglass, it acts as a structural reinforcing web within the core panel after infusion with hardenable molding resin. In this configuration, the core panel may be provided with a third veil, overlying and adhesively connected to the second veil. This third veil is of smaller dimensions than the second veil and provides the stabilizing properties previously described.

If desired, the strips or blocks may be provided with narrow grooves, preferably tapered, parallel to the edges of the strips or blocks, perpendicular to the core panel faces, and extending through most of the thickness of the core panel. Under the pressure of molding in a concave mold, the strips or blocks are forced against the curvature of the mold, which causes the tapered grooves to close, resulting in a reduction of excess resin between the surface of the mold and the faces of the strips or blocks.

Trapezoidal or triangular strips or blocks may be preferred in those portions of sandwich panels which have extensive areas of generally similar curvature. When conformed to the curved mold, spaces between the strips or blocks are minimized or even eliminated, reducing resin usage. This embodiment also constitutes an improved method of providing thermal insulation for cylindrical pipes and tanks, which generally do not employ hardenable resins.

For composite sandwich panels having shallow radius of curvature or radius of curvature which varies within the panel, it may be desirable to provide the core panels of the present invention with strips or blocks having rectangular cross section. Core panels so constructed provide enhanced machining and handling robustness, as well as reduced resin usage compared to prior art, as described above.

Other features and advantages of the invention will be apparent from the following description, the accompanying drawings and the appended claims.

BRIEF DESCRIPTION OF THE DRAWINGS

FIG. 7 is an enlarged fragmentary perspective view of another embodiment of a core panel constructed in accordance with the invention;

FIG. 8 is a fragmentary perspective view of the core panel shown in FIG. 7;

FIG. 9 is a greatly enlarged section view of a portion of FIG. 7;

FIG. 10 is a greatly enlarged view of a portion of FIG. 8;

FIG. 11 is an enlarged section view of another embodiment of a core panel constructed in accordance with the invention;

FIG. 12 is an enlarged section view of another embodiment of a core panel constructed in accordance with the invention;

FIG. 13 is a section view of the core panel shown in FIG. 12, and;

FIG. 14 is an enlarged section view of another embodiment of a reinforced foam core composite panel constructed in accordance with the invention.

DESCRIPTION OF THE PREFERRED EMBODIMENTS

Figure 1:
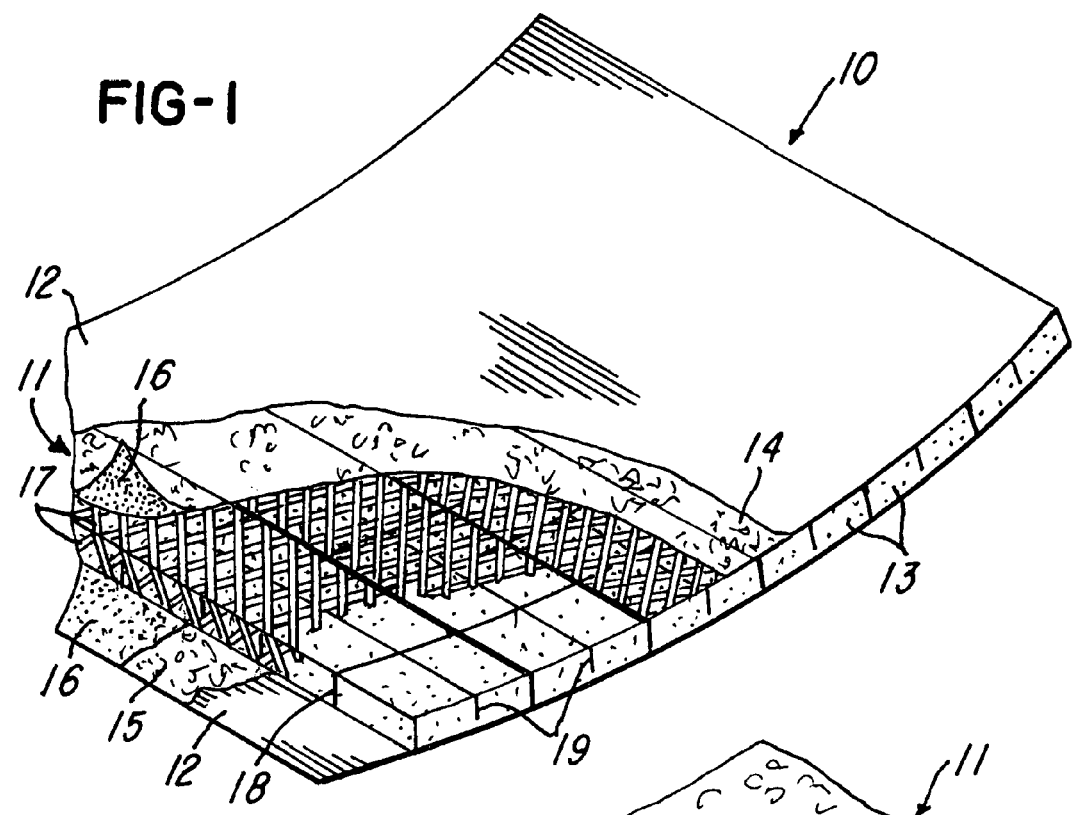
FIG. 1 is a fragmentary perspective view of a reinforced foam core composite panel constructed in accordance with the invention.
Figure 2:
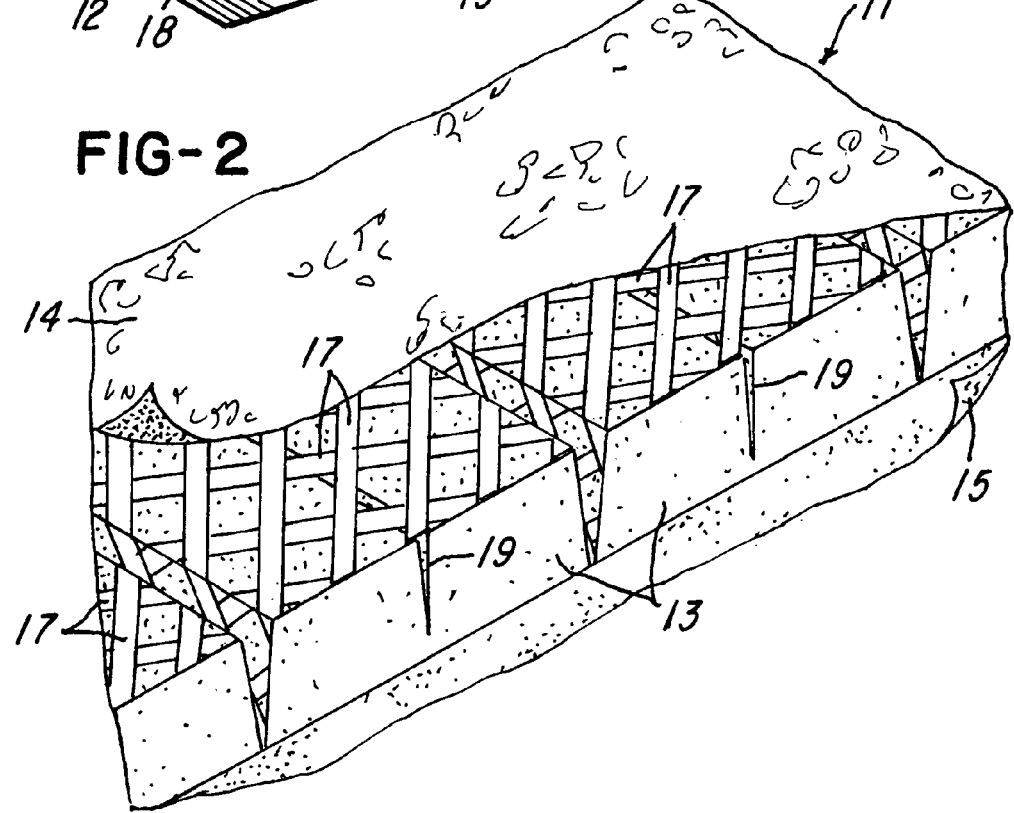
FIG. 2 is an enlarged fragmentary perspective view of a portion of the panel shown in FIG. 1.

Referring to FIG. 1, sandwich panel 10 comprises core panel 11 and sandwich panel skins 12. Core panel 11 comprises a plurality of pieces or longitudinal strips 13 adhesively attached to overlying continuous mats or veils 14 and 15 (FIG. 2). Adhesive 16 may be pre-applied to veils 14 and 15 or to strips 13, or it may be provided as a separate sheet material, for example a web-type hot melt adhesive or a hot melt scrim. Strips 13 comprise low density cellular material, for example plastics foam or balsa wood. Veil 14 comprises a flexible sheet of porous fibrous material, for example, glass fiber non-woven veil manufactured by Johns Manville Company.

The veil 14 is sufficiently flexible to buckle and fold into longitudinal spaces between foam strips 13 when the veil 14 is subjected to compressive forces in the plane of the veil and perpendicular to the strips. Alternately, veil 14 may comprise other adhesively attached materials, for example, nonwoven polyester, open mesh or scrim, parallel rows of fibers transverse to strips 13, or a film which dissolves in molding resin during the molding process. Veil 15 may be of the same composition as veil 14. Alternately it may comprise any of a variety of other flexible sheet materials, selected for desired structural, cosmetic or other properties. Examples include fiberglass fabric, aluminum, and plywood veneer.

The strips 13, as well as the strips shown in all embodiments of the invention, may be provided with helically wound reinforcing rovings 17, transverse reinforcing webs 18 or other reinforcing features, for example, as those described in U.S. Pat. No. 7,393,577, the disclosure of which is herein incorporated by reference. Some or all of the reinforcing materials may be fully or partially impregnated with fully or partially cured resin, as also described in U.S. Pat. No. 7,393,577.

Strips 13 are of trapezoidal cross section, and the parallel faces of the trapezoid strips comprise the faces or side surfaces of the core panel. If desired, strips 13 may also be provided with longitudinal grooves 19, which are preferably tapered or V-shaped. If desired, one or both faces of strips 13 may be provided with surface curvature to match the radius of curvature of the mold. In other embodiments of the invention, strips 13 may have any of a variety of cross-sectional shapes, for example triangular or circular, or they may comprise hollow tubes, or they may be spaced from other strips.

Core panel 11 illustrated in FIG. 1 is shown as it would appear after conforming transversely to a curved mold between sandwich panel skins 12 and after the application of pressure against the faces of sandwich panel 10 during the molding process. In this curved position, the edge surfaces of beveled longitudinal strips 13 are in contact with the opposing edge surfaces of adjacent strips, and tapered grooves 19 are closed under the applied pressure of the strips against the mold surface. FIG. 2 shows the planar configuration of core panel 11 prior to being placed in the mold. Beveled strips 13 and tapered grooves 19 are in open position, and veils 14 and 15 are adhesively attached to opposing faces of core panel 11.

Figure 3:
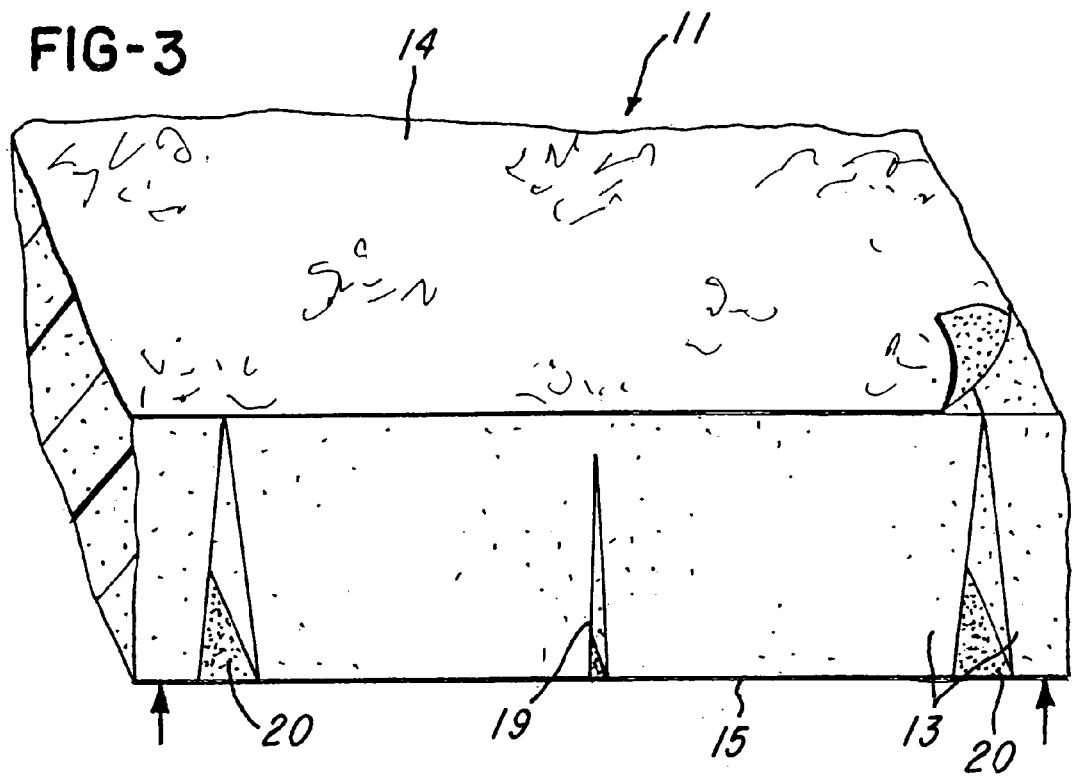
FIG. 3 is an enlarged fragmentary perspective view of a portion of the panel shown in FIG. 1.

FIG. 3 shows core panel 11 inverted from its position shown in FIG. 2, as during machining or handling. The arrows shown at bottom of FIG. 4 adjacent the right and left sides of the drawing represent supports along opposite longitudinal edges of the core panel, as by carrying the panel to a mold. Flexible veil portions 20 extending between foam strips 13 limit the articulation or flexing of the strips, so that panel 11 remains flat until inverted for placing in the mold.

Figure 4:
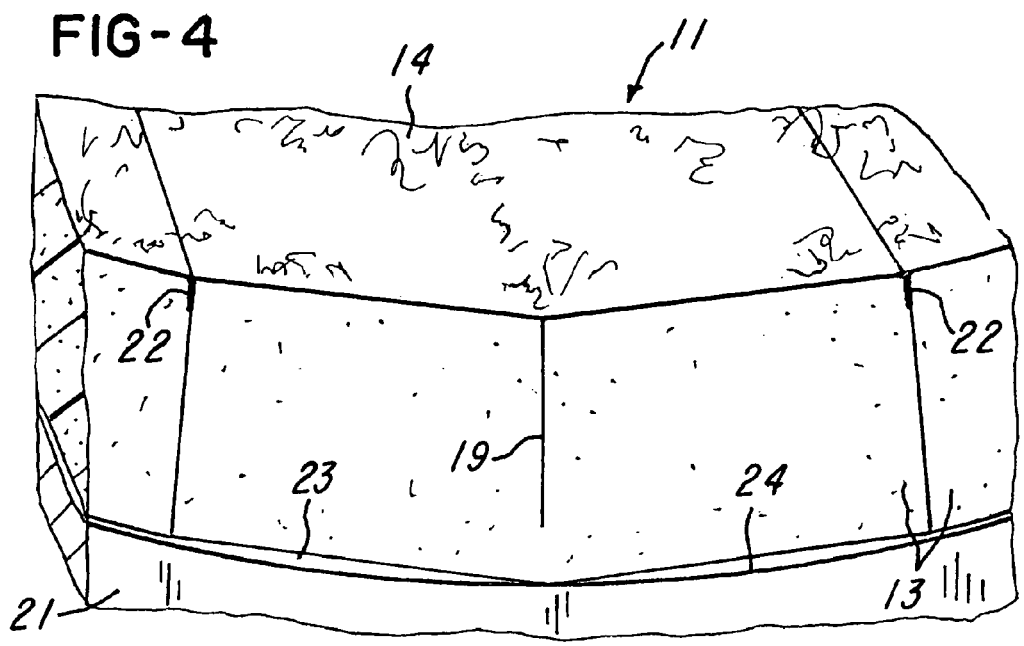
FIG. 4 is an enlarged fragmentary perspective view of a portion of the panel shown in FIG. 1.

FIG. 4 shows the displacement of portions 20 of veil 15 when core panel 11 is conformed to curved mold 21. As foam strips 13 begin to articulate, veil portions 20 which extend between the strips are subjected to transverse compressive force which causes the veil portions to buckle along parallel lines between strips 13. Since veil 15 is adhesively attached to the faces of strips 13, it is generally restrained from buckling away from the strips and therefore the portions 20 buckle inward, folding into the spaces between the beveled edges of the strips, in the form shown in FIG. 4 as folded portions 22.

This inward folding feature maintains a smooth surface on the concave face, so that flexible skin materials applied to the core panel do not wrinkle when in contact with the core panel. However, veils which are sufficiently thin and flexible may buckle outward without compromising the sandwich panel skins. FIGS. 9 and 10 show detailed views of veil 15 in folded and unfolded positions. Foam strips 13 may be provided with corner recesses into which the veil portions 22 fold. Referring again to FIG. 4, longitudinal V-groove 19 in foam strip 13 is shown closed in response to pressure applied to the faces of the core panel during the molding process. This reduces the volume of spaces 23 between flat strips 13 and curved mold surface 24, further reducing excess resin.

Figure 5:
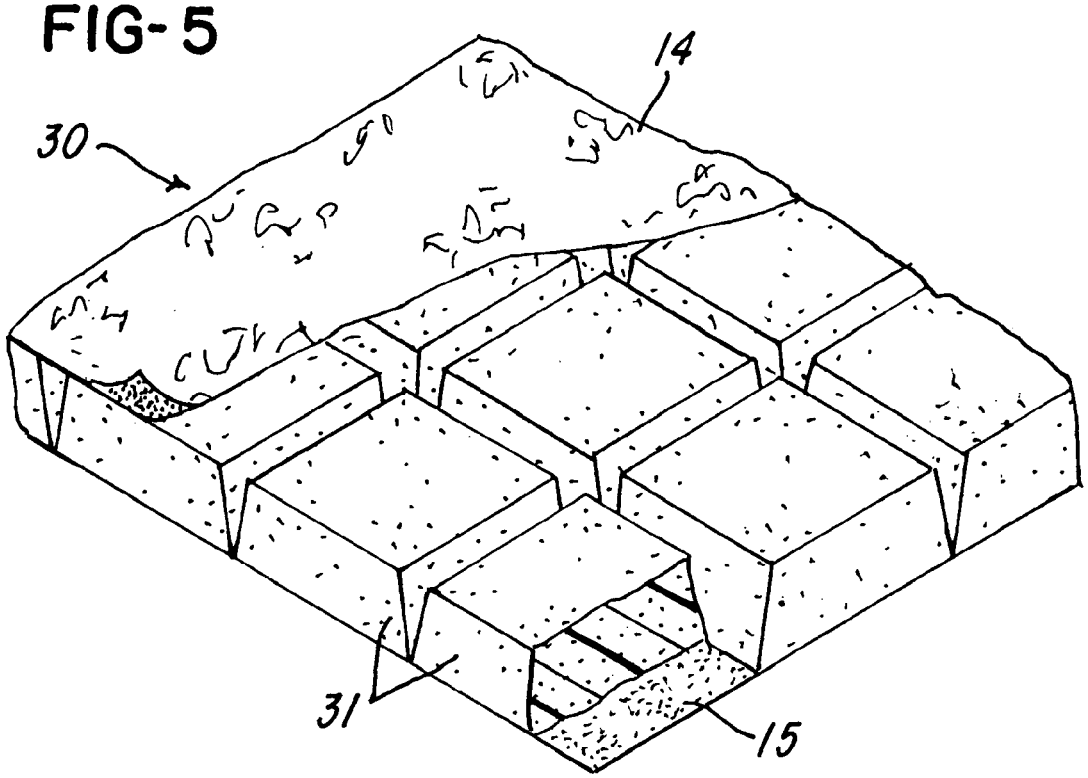
FIG. 5 is a fragmentary perspective view of a core panel constructed in accordance with another embodiment of the invention.
Figure 6:
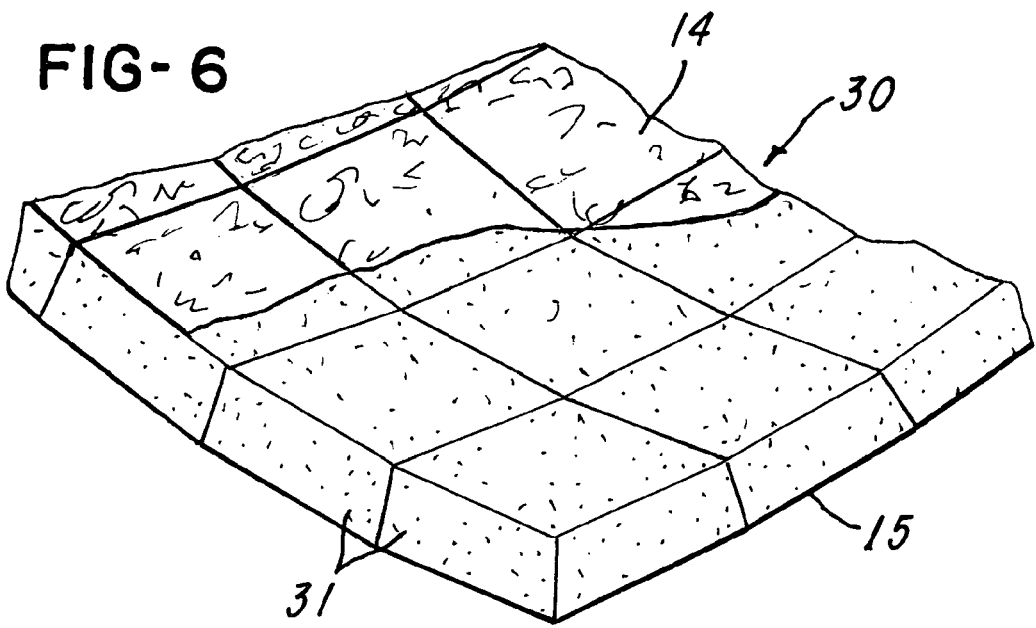
FIG. 6 is another fragmentary perspective view of the core panel shown in FIG. 5.

FIG. 5 illustrates core panel 30 which has been provided with features which permit it to bend both longitudinally and transversely in order to conform to a mold of double or compound curvature. When so conformed, core panel 30 describes a generally part-spherical configuration as shown in FIG. 6. Referring again to FIG. 5, core panel 30 comprises a plurality of low density cellular pieces or blocks 31 adhesively attached to flexible veils 14 and 15. All opposite edge surfaces of blocks 31 are tapered to provide a trapezoidal cross section, as previously described in connection with FIGS. 1-4. As core panel 30 is conformed to a mold of compound curvature, those sections of veil 14 which overlie the spaces between the pieces or blocks fold into the spaces, as previously described. Blocks 31 are shown as rectangular in plan view, but may be of triangular, hexagonal or other configuration.

Another embodiment of the invention is shown in FIGS. 7 and 8. Referring to FIG. 7, the core panel 40 is shown as it would appear in a flat mold and comprises foam pieces or strips 41 of rectangular cross section and flexible veils or mats 14 and 15, which are adhesively attached to opposing faces of foam strips 41, as previously described in connection with FIGS. 1-6. In the rectangular cross section of the strips 41, the side surfaces are generally perpendicular to the edge surfaces within each strip as shown in FIG. 7. Veil 15 is of greater width than the sum of the widths of foam strips 41, and when core panel 40 is in planar position, as for handling or machining, portions 42 (FIG. 8) of veil 15 fold between opposing edge surfaces or faces of strips 41 and form folded portions 43, shown enlarged in FIGS. 9 and 10.

FIG. 8 illustrates the position of core panel 40 when placed in a curved mold, with pieces or strips 41 articulated to the open position with the degree of articulation limited by the width of portions 42 of veil 15. Core panel 40 possesses the same advantages in handling and machining as core panel 11 described in connection with FIGS. 1-6. Core panel 40 may be provided with additional handling stability by providing folded veil portions 43, shown in FIG. 9, with weak adhesive attachment between the folds, which may be overcome while placing the core panel in a curved mold. Core panel 40 may also be constructed in bi-directional form as generally described above in connection with FIGS. 5 and 6.

FIG. 7 also shows an alternate means of providing handling stability while permitting subsequent articulation of the core panel. Veil 14 may comprise fibrous material which stretches or yields transversely under tensile force as core panel 40 is articulated with veil 14 adjacent a concave surface. Portions 44 (FIG. 7) of veil 14 are adhesively attached to foam strips 41 in spaced longitudinal rows centered on each strip 41, as indicated by dotted lines shown in FIG. 7. Those portions of veil 14 not attached to strips 41 may stretch or yield without breaking.

FIGS. 11-14 illustrate embodiments in which portions of the flexible and porous mat or veil which comprises one of the faces of the core panel extend entirely through the thickness of the core panel. Referring to FIG. 11, core panel 50 comprises rectangular foam pieces or strips 41, non-folded veil 51, and folded veil or mat 52 having folds 53 which extend between opposing side surfaces of strips 41 to the opposite face of the core panel, terminating adjacent veil 51. Veils 51 and 52 are adhesively attached to opposite faces of strips 41, and portions 53 of veils 52 may be adhesively attached to opposing surfaces of strips 41 for improved handling and machining stability. Strips 41 may rotate or articulate about the lines of adhesive attachment between veil 51 and folds 53.

In order to limit the extent of rotation or flexing of core panel 50 during handling of the core panel, an additional veil is provided, as illustrated in FIG. 12. Veil 61 is adhesively attached to veil 52 and is folded between strips 41 when core panel 60 is in planar position. As shown in FIG. 13, when core panel 60 conforms to mold curvature, strips 41 are constrained by veil 61 to limit rotating or articulating freely, thus providing core panel with improved handling properties compared to core panel 50 shown in FIG. 11.

Referring again to FIG. 11, in a preferred embodiment of the invention, folded veil 52 may comprise a fibrous reinforcing mat of sufficient strength to impart substantial structural properties to core panel 50. Veil 52 may comprise, for example, a glass fiber nonwoven mat having a weight of one-half ounce per square foot. When folded double as shown in FIG. 11, mat 52 forms a double wall fiberglass web having a weight of one ounce per square foot between each of strips 41 and extending between opposing faces of core panel 50. When placed in a mold between fibrous reinforcing skins such as fiberglass fabric and infused with a curable adhesive resin, double wall folds 53 formed of mat 52 comprise reinforcing members or webs having substantial shear and compressive strength and also serving to tie the skins of the sandwich panel together.

FIG. 14 illustrates another embodiment of the present invention having structural double wall webs as described in connection with FIG. 11 and which also provides enhanced attachment strength of the structural webs to the sandwich panel skin adjacent the termination of the structural webs. Sandwich panel 70 comprises reinforced core panel 71 and fibrous sandwich panel skins 72 and 73. Core panel 71 comprises folded reinforcing mat 74 and strips 41 of low density cellular material, such as plastics foam. During the manufacturing process, folded webs 75, formed from structural mat 74, are extended beyond the face of core panel 71, and the extended portions of mat 74 are folded onto the surface of strips 41 to form structural flanges 76 adjacent and parallel to sandwich panel skin 73. Flanges 76 greatly increase the area of structural attachment of folded webs 75 to sandwich panel skin 73.

Foam strips 41 may be provided with shallow grooves 77 into which flanges 76 fold, in order to maintain flatness of the face of core panel 70. If desired, core panel 71 may be provided with a surface veil to limit its articulation, as described above in connection with FIGS. 12 and 13, and core panel 71 may be provided with transverse reinforcing members as previously described herein. It is within the scope of the invention to invert one or more of the low density cellular strips which comprise a core panel so that the core panel may conform to a mold having curvature which reverses from concave to convex.

While the methods and forms of core panels and sandwich panels herein described constitute preferred embodiments of the invention, it is to be understood that the invention is not limited to the precise methods and forms described, and that changes may be made therein without departing from the scope and spirit of the invention as defined in the appended claims.

What is claimed is:

1. A composite panel having an upper side and a lower side comprising:
    a plurality of elongated strips of cellular material selected from the group consisting of balsa wood and foam plastic positioned to form a core panel, wherein the elongated strips have a generally rectangular cross-section having flat and opposite side surfaces and with adjacent elongated strips having flat and opposing edge surfaces extending between the side surfaces, wherein the side surfaces are generally perpendicular to the edge surfaces within each strip;
    a first sheet of flexible material adhesively attached to the side surfaces of each of the elongated strips facing the upper side of the composite panel;
    a second sheet of flexible material adhesively attached to the side surfaces of each of the elongated strips facing the lower side of the composite panel with portions of the second sheet extending between the opposing edge surfaces of adjacent the elongated strips, wherein the portions of the second sheet are effective to limit flexing of the first sheet for limiting curvature of the panel.

2. The composite panel of claim 1, wherein the portions of the second sheet extending between the opposing edge surfaces extend completely through the thickness of the panel to form double wall webs and wherein adhesive attaches the double wall webs to the first sheet.

3. The composite panel of claim 2, wherein the double wall webs include structural flanges extending parallel to the first sheet of material, and the structural flanges are adhesively attached to the first sheet of material.

4. The composite panel of claim 3, further comprising a third sheet of flexible material attached by adhesive to the second sheet of flexible material and having double wall portions projecting between the double wall webs to limit flexing of the panel.

5. The composite panel of claim 2, further comprising a first sandwich panel skin of rigid material adhesively attached to the first sheet of material and a second sandwich panel skin of rigid material adhesively attached to the second sheet of flexible material.

6. The composite panel of claim 1, wherein the opposing edge surfaces of the elongated strips are tapered to form V-shaped spaces between the adjacent elongated strips and the portions of the second flexible sheet project into the spaces between the opposing edge surfaces of the elongated strips in response to flexing of the panel.

7. A composite panel having an upper side and a lower side comprising:
    a plurality of elongated strips of cellular material selected from the group consisting of balsa wood and foam plastic positioned to form a core panel, wherein the elongated strips have a generally rectangular cross-section having flat and opposite side surfaces and with adjacent elongated strips having flat and opposing edge surfaces extending between the side surfaces, wherein the side surfaces are generally perpendicular to the edge surfaces within each strip;
    a first sheet of flexible material adhesively attached to the side surfaces of each of the elongated strips facing the upper side of the composite panel;
    a second sheet of flexible material adhesively attached to the side surfaces of each of the elongated strips facing the lower side of the composite panel, wherein the second sheet of flexible material comprises stretchable material having portions unattached to the side surfaces of each of the elongated strips facing the lower side of the composite panel and which stretches in response to flexing of the panel for fitting the panel to a curved surface.

* * * * *